(12) United States Patent
Yoshimatsu

(10) Patent No.: US 6,244,660 B1
(45) Date of Patent: Jun. 12, 2001

(54) POWER SEAT FOR VEHICLES

(75) Inventor: Satoru Yoshimatsu, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/398,429

(22) Filed: Sep. 17, 1999

(30) Foreign Application Priority Data

Sep. 17, 1998 (JP) .................................................. 10-263412

(51) Int. Cl.[7] .................................................. A47C 1/02
(52) U.S. Cl. ........................ 297/344.1; 248/429; 297/337
(58) Field of Search .............................. 297/337, 344.1, 297/344.11; 248/429, 424, 430

(56) References Cited

U.S. PATENT DOCUMENTS

| | | | |
|---|---|---|---|
| 5,048,786 | * | 9/1991 | Tanaka et al. ........................ 248/429 |
| 5,150,872 | * | 9/1992 | Isomura ................................ 248/429 |
| 5,259,257 | * | 11/1993 | Mouri ............................ 297/344.1 X |
| 5,303,881 | * | 4/1994 | Aronne .......................... 297/344.1 X |
| 5,765,798 | * | 6/1998 | Isomura ............................ 248/429 X |
| 5,823,499 | * | 10/1998 | Ito et al. ................................ 248/429 |

FOREIGN PATENT DOCUMENTS

| | | |
|---|---|---|
| 42 27 846 C1 | 9/1993 | (DE) . |
| 43 01 241 A1 | 7/1994 | (DE) . |
| 43 30 367 A1 | 3/1995 | (DE) . |
| 41 27 503 C2 | 5/1995 | (DE) . |
| 5-024466 | 2/1993 | (JP) . |

* cited by examiner

*Primary Examiner*—Peter M. Cuomo
*Assistant Examiner*—Stephen Vu
(74) *Attorney, Agent, or Firm*—McDermott, Will & Emery

(57) ABSTRACT

An upper rail (5a) carrying a seat cushion (2) is driven to slide on a lower rail (5b) fixed to a stationary base (B), with a power-controlled drive mechanism (D) including a gear box (7) fixed to the upper rail, a lead screw (8a) extending from the gear box, a nut member (10) fixed to the lower rail and screwed on the lead screw, and a bracket (13) as a rigid member fixed to the upper rail at a different position from the gear box and engaging with the lead screw in an axially secured manner.

11 Claims, 5 Drawing Sheets

POWER SEAT FOR VEHICLES

BACKGROUND OF THE INVENTION

The present invention relates to a power seat for vehicles, and particularly, to a power seat for vehicles including a power-assisted sliding rail structure for carrying a seat mounted thereon.

A power seat with such a sliding rail structure has been disclosed in Japanese Patent Application Laid-Open Publication No. 5-024466.

In this conventional power seat, when the vehicle is subjected to a collision, acceleration or deceleration, a load is applied to a pair of upper and lower sliding rails via a seat member in a sliding direction of the rails. Essentially, this load is transmitted from the upper rail, which carries the seat member, via a gearbox and a lead screw in a drive unit, which is fixed to a front end of the upper rail, and further through a nut member screwed on the lead screw, ultimately to the lower rail.

Considering the case of a front-end collision in which a collision load of several times the weight of an occupant is applied to the upper rail in a forward direction of the vehicle, there develops a significant bending moment in a front end region of the upper rail to which the gear box is fixed. In the, case of a rear-end collision in which a load is applied in a rearward direction of the vehicle, a similar moment develops in a reverse direction.

Reinforcement is required to counter the effect of such a moment. For example, to prevent deformation of the upper rail by the moment, it is necessary to provide reinforcement by making the thickness of the upper rail larger, and to prevent deformation of the lead screw, it is necessary to make the diameter of the lead screw larger. These measures are accompanied by additional cost and weight.

As the collision load is applied directly to the gear box, it is necessary for the gear box to be made of such a material and to have such a construction that can withstand this load. This leads to an extra cost, and a failure to achieve a compact gear box design for efficient use of space and reduction in weight.

SUMMARY OF THE INVENTION

The present invention has been made with such points in view. It therefore is an object of the invention to provide a power seat for vehicles including a power-assisted stronger sliding rail structure, while reducing cost and weight.

To achieve the object, an aspect of the invention provides a power seat for vehicles comprising a seat member, a pair of first and second rails slidable relative to each other and either carrying the seat member, and a powered drive mechanism including a gear box fixed to the first rail, a lead screw extending from the gear box, a nut member fixed to the second rail and screwed on the lead screw, and a rigid member fixed to the first rail at a different position from the gear box and engaging with the lead screw in an axially secured manner.

According to the aspect of the invention, axial impact loads are transmitted between first and second rails, firstly via a rigid member, and secondly via a gear box in which gears have backlashes.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 a side view of a power seat installed in a vehicle according to an embodiment of the invention;

DETAILED DESCRIPTION OF THE PREFERRED EMBODIMENTS

Figure 1:
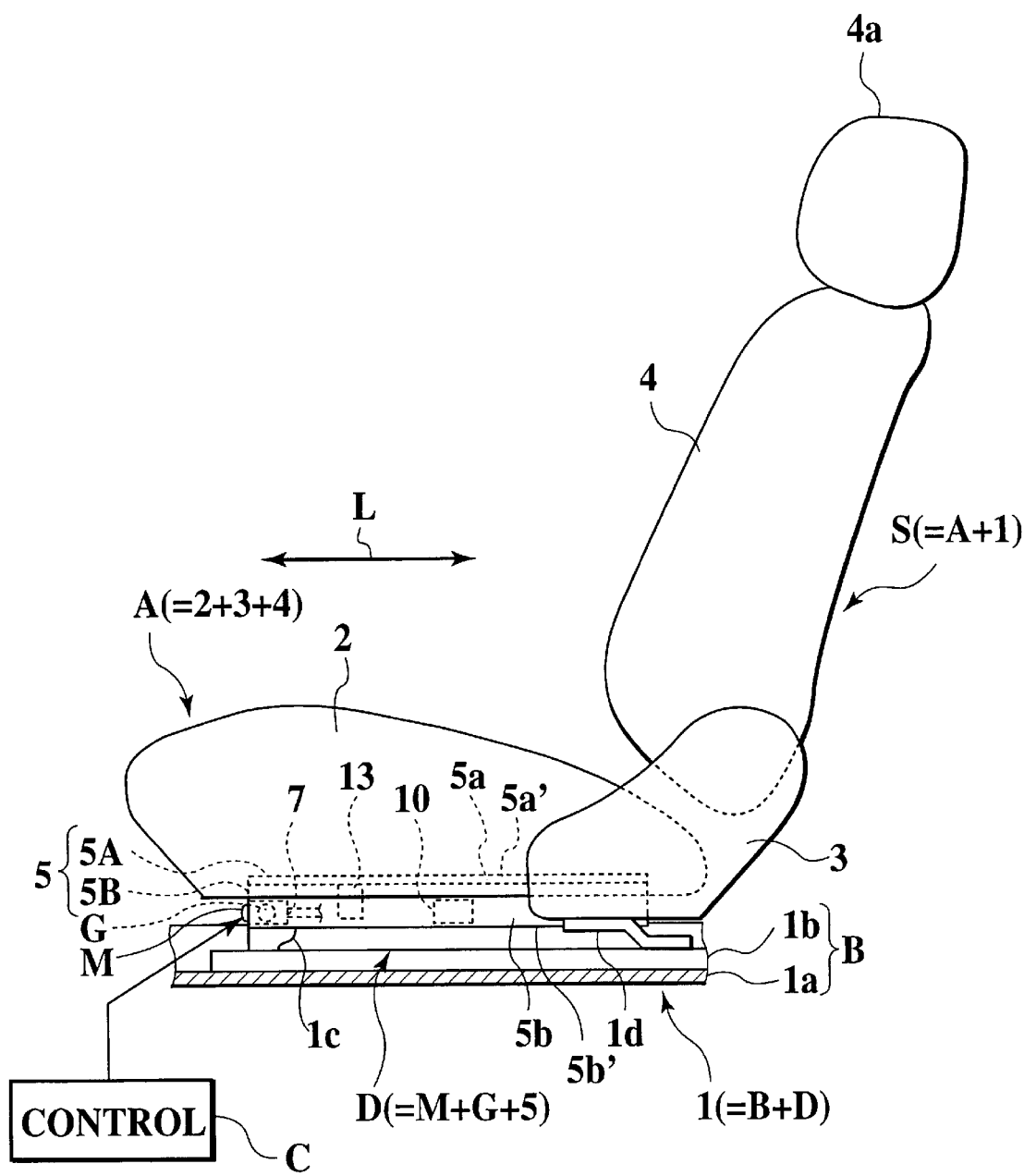

There will be detailed below a preferred embodiment of the present invention and modifications thereof, with reference to the accompanying drawings. Like members are designated by like reference characters.

FIG. 1 shows a power seat S installed as a front or rear seat in an automobile.

The power seat S comprises: a seat assembly A that is comprised of a seat cushion 2 which may have (an) arm rest(s), a back rest 4 which is provided with a head rest 4$a$ and may have a back-bone curvature control mechanism, a back-rest reclining mechanism 3 which may be powered for reclining actions in a longitudinal direction L of the automobile; and a power-assisted seat sliding mechanism (hereafter called "power seat mechanism") 1.

The power seat mechanism 1 comprises: a seat supporting base B that is constituted with a floor panel 1$a$ as part of a vehicle body of the automobile and/or a square support frame 1$b$ fixed to the floor panel 1$a$; and a powered drive mechanism D that is comprised of an electric step motor M which is located under a front central portion of the seat cushion 2 and controlled from a controller C installed in the arm rest or in an instrument panel, a drive gear unit G which is driven by the motor M, and a sliding rail structure 5.

The sliding rail structure 5 comprises: an upper rail assembly 5A that is fastened to a main frame of the seat cushion 2 and constituted with left and right upper rails 5$a$, 5$a$' which may be joined to each other by transverse and/or diagonal cross members; and a lower rail assembly 5B that is fixed by front brackets 1$c$ and rear stays 1$d$ to the seat supporting base 5B and constituted with left and right lower rails 5b, 5$b$' which may be joined to each other by transverse and/or diagonal cross members.

Figure 2:
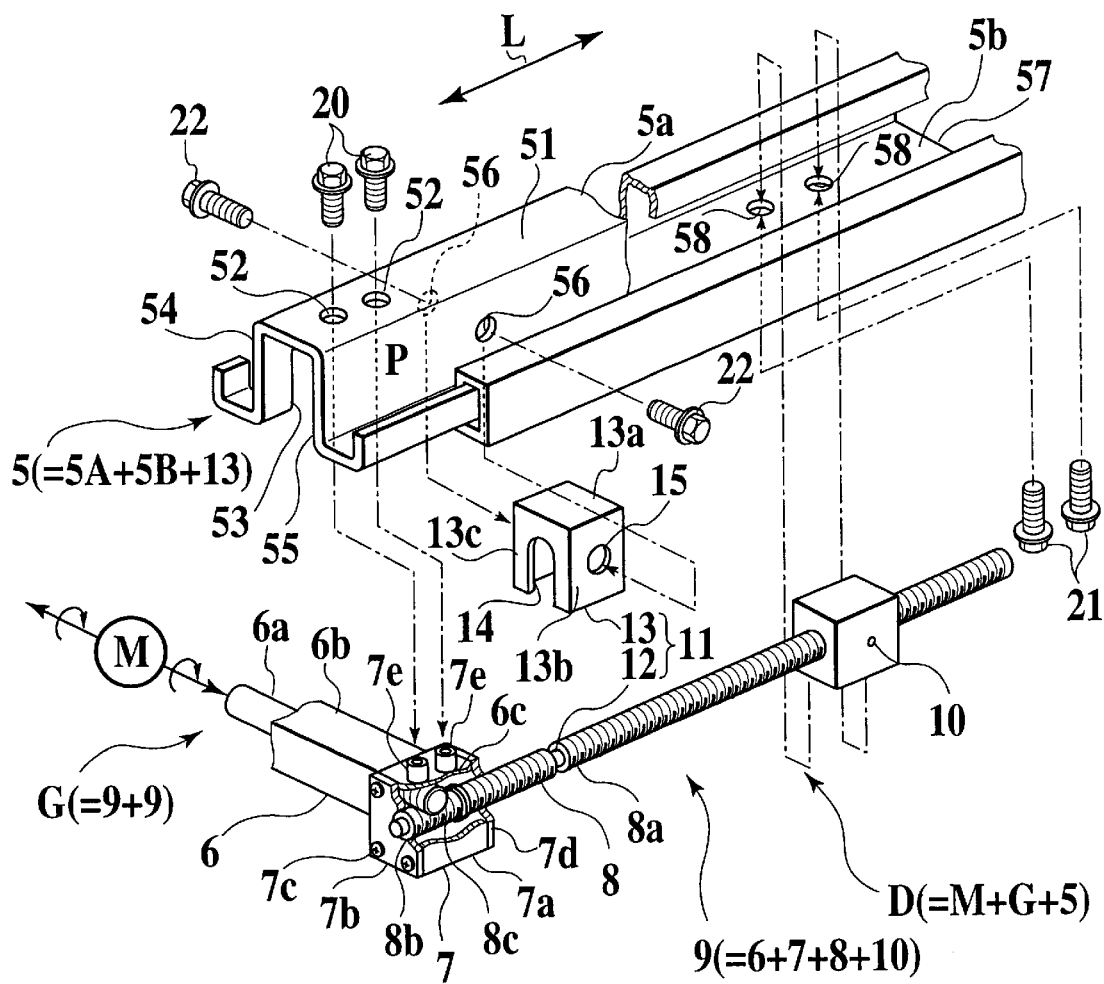
FIG. 2 is an exploded perspective view, partly in section, of a drive mechanism of the powers of FIG. 1.
Figure 3:
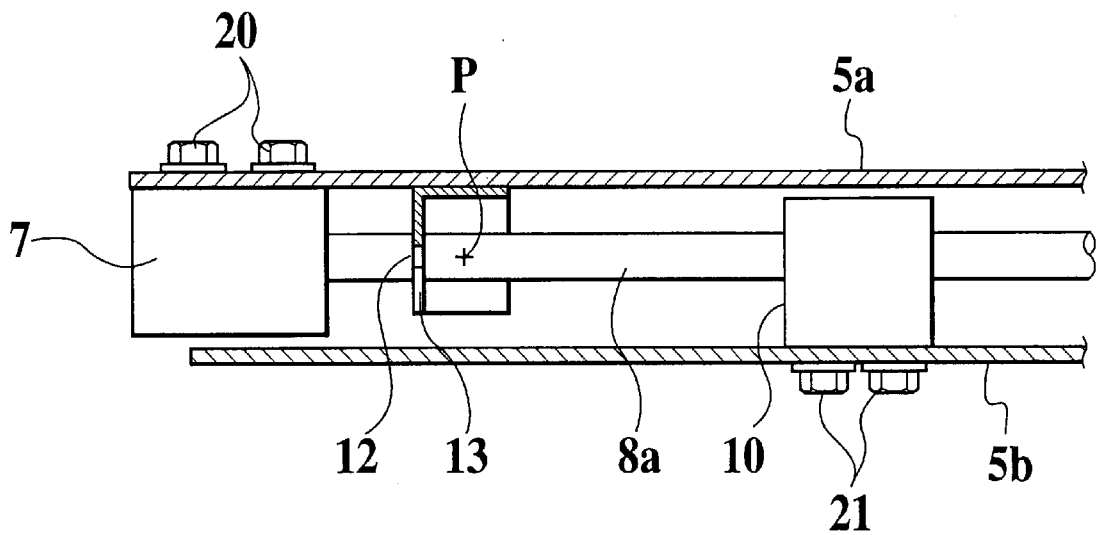
FIG. 3 is a sectional side view of the drive mechanism of FIG. 2.

FIGS. 2 and 3 show an essential portion of the drive mechanism D, as a combination of respective left portions of the sliding rail structure 5 and the drive gear unit G.

At both sides of the seat assembly A, the upper rail 5$a$(or 5$a$'), which has a side-flanged Π form or Ω form in section, and the lower rail 5$b$(or 5$b$'), which has a side-curled C form in section, are engaged with each other as depicted, to be longitudinally slidable relative to each other.

The drive gear unit G comprises a pair of left and right drive units 9 that are each comprised of a drive shaft assembly 6, a reduction gear box 7, a lead screw assembly 8, and a nut member 10.

The drive shaft assembly 6 is constituted with a drive shaft 6$a$ driven by the motor M, a shaft case 6$b$ which accommodates the drive shaft 6a, and a worm gear 6c formed or fixed on a left end of the drive shaft 6a. The shaft case 6b is fitted in an opening 53 formed through a right side wall 54 of the upper rail 5a.

The gear box 7 is constituted as a cuboid gear case 7a having a front cover 7b fastened thereto by "bolts, screws, machine screws or other threaded fastening elements" (hereafter collectively "bolts") 7c, a rear cover 7d likewise fastened thereto, and a pair of internally threaded top bosses 7e welded thereto. Each boss 7e is fastened to a top wall 51 at a front end of the upper rail 5a, by a bolt 20 inserted downward in a through hole 52 formed in the top wall 51. The worm gear 6a is fitted between and rotatably supported by left and right side walls of the gear case 7a.

The lead screw assembly 8 is constituted with a lead screw 8a which rearwardly projects from the gear box 7 and longitudinally extends along a hollow region defined between the top wall 51 of the upper rail 5a and a bottom wall 57 of the lower rail 5b as well as between the right side wall 54 and a left side wall 55 of the upper rail 5a, a metallic bush 8b fitted on a front end of the lead screw 8a and fastened thereto by an unshown bolt, and a resinous worm wheel 8c fixed to bush 8b and meshing with the worm gear 6c at right angles. The bush 8b is fitted between and rotatably supported by the front and rear covers 7b, 7d of the gear box 7. The drive shaft assembly 6 and the lead screw assembly 8 have backlashes therebetween in the gear box 7, which allows slight axial displacement of the lead screw 8a relative to the gear case 7a and permits a delayed or softened reception or transmission of an impact transmitted to the gear box 7 in an axial direction of the lead screw 8a.

The nut member 10 is screwed on a threaded portion of lead screw 8a, and mounted on the bottom wall 57 of the lower rail 5b by fastening with a pair of bolts 21 inserted upward in through holes 58 formed in the bottom wall 56.

The sliding rail structure 5 further comprises a pair of left and right box-like brackets 13 as rigid members for direct load transmission between the upper and lower rail assemblies 5A and 5B, or more specifically between each upper rail 5a or 5a' and the lead screw 8a. Each bracket 13 is open at the rear side and the bottom. Left bracket 13 as well as right bracket 13 abuts at a top wall 13a thereof on a downside of the top wall 51 of the upper rail 5a, is fastened at both side walls 13b thereof to the side walls 54 and 55 of the upper rail 5a by a pair of bolts 22 applied through holes 56 formed in the side walls 54 and 55 and holes 15 in the side walls 13b, and rides at a U-shaped or cap-form cutout 14 of a front wall 13c thereof astride on a diameter-reduced circumferential groove 12 formed in the lead screw 8a between the gear box 7 and the nut member 10.

The actual sliding action of the power seat mechanism 1 occurs in response to the operation of a switch of the controller C, for example, which causes the drive shaft 6a to be driven by the motor M, the motive power of the shaft 6a being changed in speed and output, via the worm gear 6c and the worm wheel 8c within the gear box 7 that makes a connection between the drive shaft assembly 6 and the lead screw assembly 8, so as to rotationally drive the lead screw 8a. The nut member 10 that is meshed to the lead screw 8a is fixed to the lower rail 5b and, as the lead screw 8a rotates, the upper rail 5a, to which is fixed the gear box 7 that is joined with the lead screw 8a and the bracket 13 that is axially secured to the lead screw 8a, moves relative to the lower rail 5b, thereby adjusting the position of the seat assembly A forward or back.

When the upper rail 5a and the lower rail 5b move in a sliding direction that is the longitudinal direction L relative to each other with a significant load acting thereon due to a collision or acceleration or deceleration of the automobile, the bracket 13 engages tight with the lead screw 8a and supports the load.

There is a prescribed amount of clearance between the U-shaped cutout 14 of the bracket 13 and the groove 12, so that usually no adverse affects are given to the rotational drive of the lead screw 8a.

A load transmission means 11, which is made up of the bracket 13 and the groove 12, is disposed between the mounting position of the drive unit 9 to the upper rail 5a and the mounting position of the nut member 10 to the lower rail 5b, so that when a front-end collision of the automobile causes a load to be applied to the upper rail 5a in the longitudinal direction L, the load, which is applied to the lead screw 8a via the load transmission mechanism 11, is supported in the direction that applies tension to the lead screw 8a, thereby acting to enhance the support rigidity when a collision occurs.

The bracket 13 is mounted to the upper rail 5a by two bolts 22 at positions P that are symmetrical about the axis of the lead screw 8a.

According to the embodiment, in which a load is applied to the upper rail 5a from the seat cushion 2 in the sliding direction of the sliding rail structure 5 and is transmitted along the axial direction of the lead screw 8a by the load transmission mechanism 11, it is not necessary to make the thickness of the upper and lower rails 5a, 5b large to prevent deformation thereof, nor is it necessary to increase the diameter of the lead screw 8a to prevent its deformation. This enables a reduction in weight of the power seat mechanism 1, as well as a reduction in cost.

Further, as a collision load is transmitted by the load transmission mechanism 11, the load applied to the gear box 7 of the drive unit 9 can be reduced, thereby allowing a reduction in both the size and the weight of the gear box 7.

The load transmission mechanism 11 in this embodiment is made up of a groove 12 provided in the lead screw 8a, and the bracket 13 which has a cutout 14 that mates with the groove 12, and it is possible not only to make the construction of the load transmission mechanism 11 simple, but also to limit the flexure of the lead screw 8a when a load is transmitted thereto via the bracket 13, thereby enabling a secure engagement and transmission of the input load.

Further, the bracket 13 is mounted to the upper rail 5a by two bolts 22 at positions P, which are symmetrical about the axis of the lead screw 8a. When the bracket 13 mates with the groove 12 of the lead screw 8a, the point of action of the load, which is the axis center, and the mounting positions P on both sides of the bracket 13 are in the same plane, the result being that the load is transmitted by the center of the axis of the lead screw 8a, thereby reducing a moment that develops between the point of action and the mounting position, and enabling reliable engagement and support of the input load.

In the embodiment described, the drive unit 9 is fixed to the front end of the upper rail 5a, and the nut member 10 is fixed to the lower rail 5b at a position that is further to the rear than the mounting position of the drive unit 9 to the upper rail 5a. Then, the load transmission mechanism 11 is provided at a position between that mounting position, where the drive unit 9 is fixed to the upper rail 5a, and this mounting position, where the nut member 10 is fixed to the lower rail 5b. As a result, the support rigidity when a collision occurs is improved.

Figure 4:
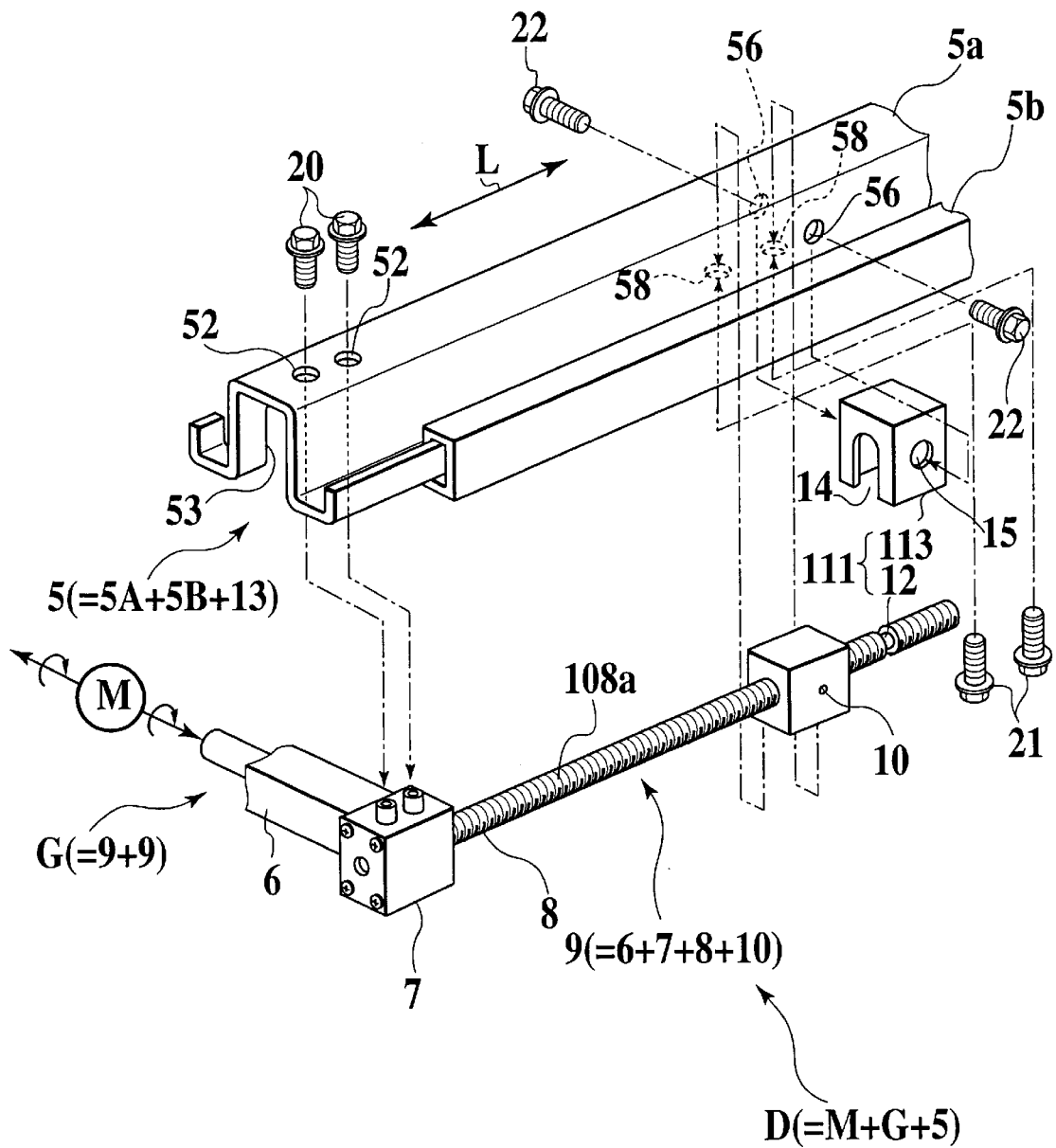
FIG. 4 is an exploded perspective view of a powered drive mechanism of a power seat according to a modification of the embodiment.

To this point, FIG. 4 shows a modification in which a load transmission mechanism 111 is made up of a bracket 13, and a circumferential groove 112 located on a lead screw 108a at a position that is further to the rear of an automobile than a mounting position of a nut member 10 to an upper rail 5a.

When the automobile is subjected to a rear-end collision thereby applying a load to the upper rail 5a in a direction toward the rear of the automobile, the load applied to the lead screw 108a via the load transmission mechanism 111 is supported in a direction that applies tension to the lead screw 108a, thereby enhancing the support rigidity thereof when a rear end collision occurs.

Figure 5:
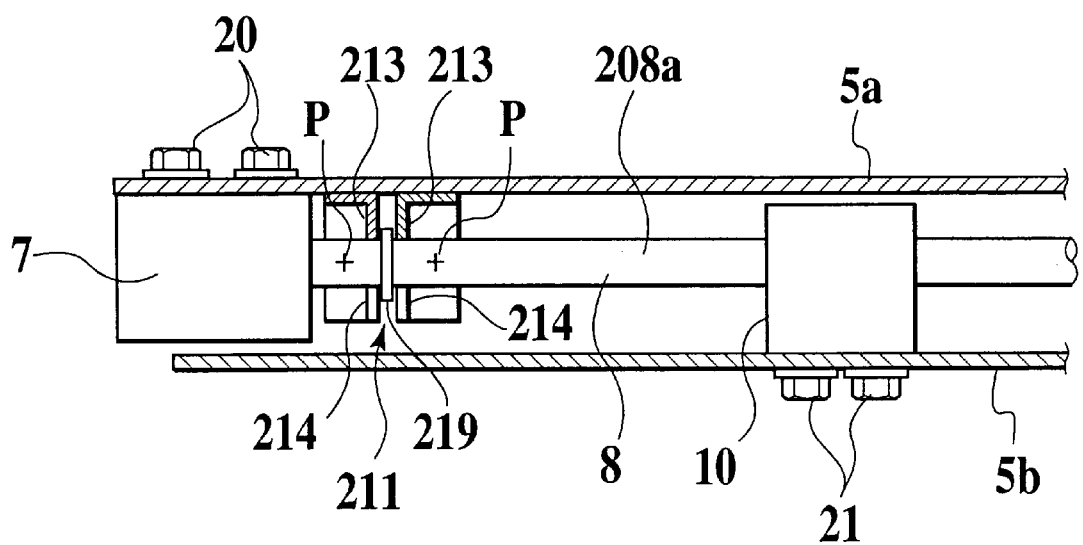
FIGS. 5 to 7 are sectional views of powered drive mechanisms according to different modifications.

FIG. 5 shows another modification in which a load transmission mechanism 211 comprises a circumferential projection 219 formed on a lead screw 208a, and a pair of back-opposing brackets 213 mounting at U-shaped cutouts 214 thereof astride on the lead screw 208a and abutting on front and rear sides of the circumferential projection 219 with necessary clearances provided. The brackets 213 are secured to an upper rail 5a.

When a load due to a collision, acceleration or deceleration is applied in a moving direction of an automobile that is a sliding direction of sliding rails 5a and 5b, even if there is relative movement between the upper and lower rails 5a and 5b, the projection 219 provided on the lead screw 208a engages with the brackets 213 so as to transmit the load. It is possible to simplify the construction of the sliding rails, thereby providing an advantage in terms of cost reduction.

Figure 6:
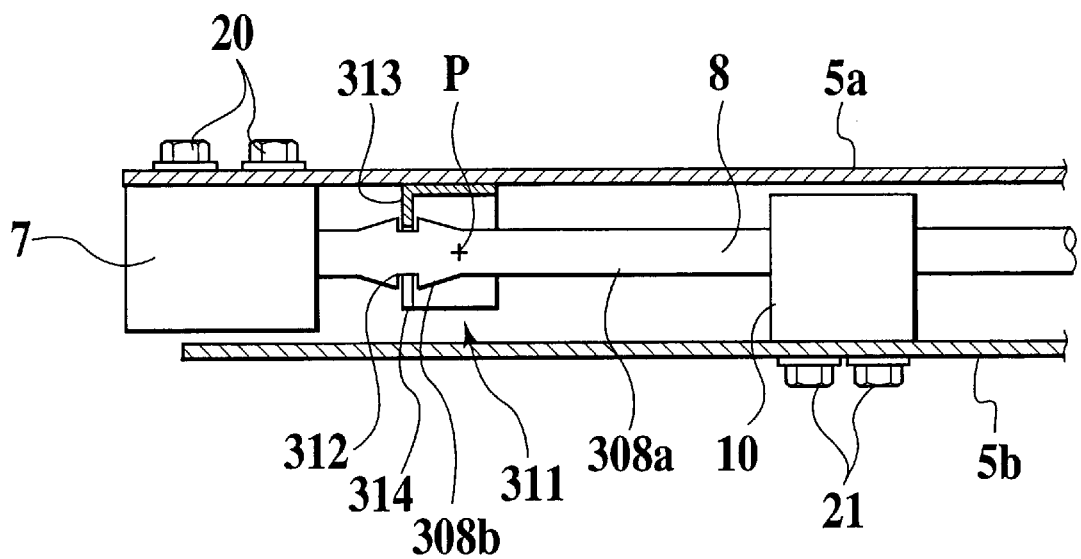

FIG. 6 shows another modification in which a load transmission mechanism 311 comprises a circumferential groove 312 formed in a bulged portion 308b of a lead screw 308a, and a bracket 313 secured to an upper rail 5a and mounting at a U-shaped cutout 314 thereof astride on a bottom of the groove 312 with necessary clearances provided.

Figure 7:
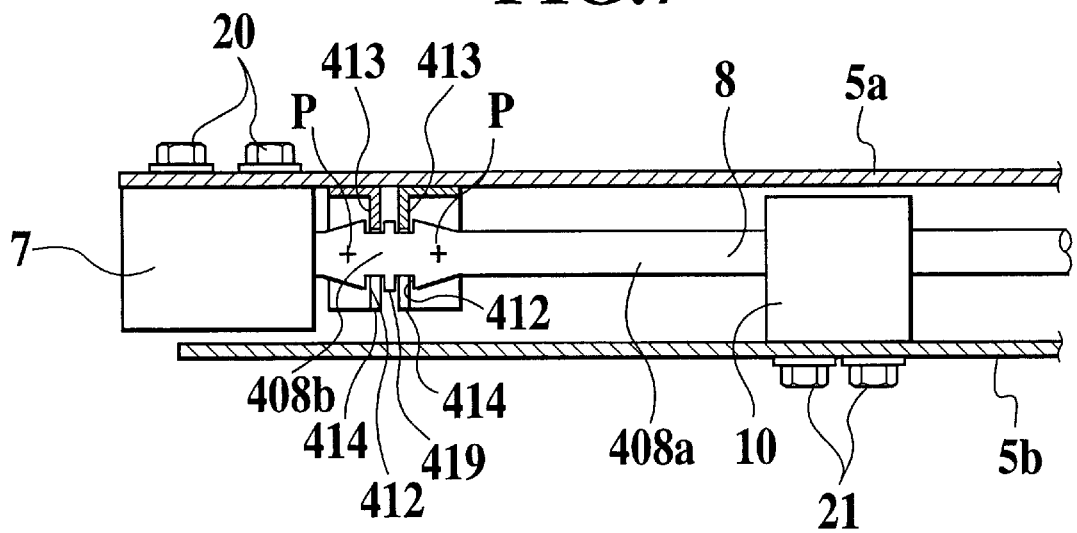

FIG. 7 shows another modification in which a load transmission mechanism 411 comprises a circumferential projection 419 defined between a pair of circumferetial grooves 412 formed in a bulged portion 408b of a lead screw 408a, and a pair of back-opposing brackets 413 secured to an upper rail 5a and mounting at U-shaped cutouts 414 thereof astride on bottoms of the grooves 412 with necessary clearances provided.

Figure 8:
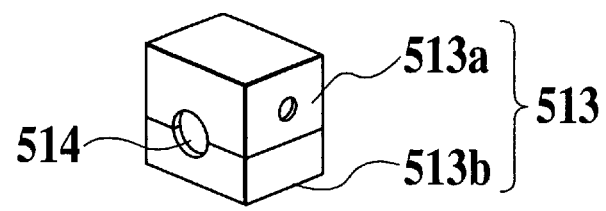
FIG. 8 is a perspective view of a nut member according another modification.

In the embodiment shown in FIGS. 1 to 3, a bracket 13 having a U-shaped cutout 14 is used. It will be understood that it is also possible to employ a different bracket. FIG. 8 shows a modified bracket 513 that is divided into two parts: a main bracket 513a having a substantially U-shaped or semi-circular cutout to be fixed to an upper rail 5a; and a sub-bracket 513b having a substantially U-shaped or semi-circular cutout to be joined to the main bracket 513a. When the bracket 513 is engaged with a circumferential groove 12 of a lead screw 8a inserted through opening 514 formed by the adjacently disposed substantially U-shaped or semi-circular cutouts in brackets 513a and 513b, the lead screw 8a is surrounded by the main bracket 513a and the sub-bracket 513b, thereby reducing the flexure of the lead screw 8a against a load transmitted thereto, and providing a reliable engagement and transmission of the applied load.

It should be noted that, while the foregoing embodiment and modifications are for the case in which a drive unit 9 is mounted to a front end of an upper rail 5a and in which a nut member 10 meshing with a lead screw assembly 8 of the drive unit 9 is mounted to a lower rail 5b, it is also possible to adopt a reverse arrangement, in which a nut member 10 is mounted to an upper rail 5a, and a drive unit 9 is mounted to a lower rail 5b.

According to the embodiment, a power seat S includes a power seat mechanism 1 comprising: a sliding rail structure 5 that has an upper sliding rail 5a, which is fixed to a bottom part of a seat cushion 2, and a lower sliding rail 5b, which is fixed to a vehicle body 1a; a drive gear unit G that is powered from a motor M and fixed to either the upper rail 5a or the lower rail 5b and that has a gear box 7, which changes the speed of rotation of the motor M and outputs a changed speed, a lead screw assembly 8, which is rotated by the output of the gear box 7, and a nut member, with which a lead screw 8a meshes. The power seat mechanism 1 has a load transmission mechanism 11, which transmits a load that is applied from a seat assembly A to the upper rail 5a in a sliding direction of the rails 5a, 5b that extend in an axial direction of the lead screw 8a.

By this configuration, conventional reinforcement measures such as increasing the thickness of sliding rails in order to prevent deformation thereof, and making the diameter of a lead screw large to prevent deformation thereof are rendered unnecessary, thereby contributing reductions in both weight and cost of the sliding rails.

In the embodiment, by transmitting collision loads using the load transmission mechanism 11, it is possible to reduce an input to the gear box 7 of a drive unit 9, thereby enabling a reduction in size of the gear box 7, and providing an advantage in terms of weight as well.

Further, in the embodiment, the load transmission mechanism 11 includes an engaging portion of a lead screw 8a, and a bracket 13 which is fixed to one of sliding rails 5a, 5b and which engages with the engaging portion, so as to allow rotation of the lead screw 8a, but not allow movement in an axial direction thereof.

By virtue of this configuration, it is possible to simplify the construction, and to limit the flexing of the lead screw 8a when a load is transmitted by the bracket 13, thereby achieving a secure engagement and transmission of the input load.

Further, the engaging portion comprises a circumferential groove 12 as a depression formed in a outer circumference of the lead screw 8a, and the bracket has a U-shaped cutout 14 that engages with the groove 12 of the lead screw 8a.

This configuration enables a simplification of the sliding rail structure 5, and achieves an advantage in terms of cost as well.

In a modification, the engaging portion comprises a circumferential projection or protrusion 219 formed on an outer circumference of a lead screw 208a, and a bracket 213 has a U-shaped cutout 214 that engages with the protrusion 219 of the lead screw 208a, enabling a simplification of the sliding rail structure 5, achieving an advantage in terms of cost.

Further, a bracket 13 is fixed to a sliding rail 5a, at positions from both side, these positions being in symmetrical about an axis of a lead screw 8a.

As a result, when the bracket 13 and a groove 12 of the lead screw 8a engage with each other, an axial center which is the point of action of a load and the bracket mounting points on both sides are in one and the same plane. The load is accurately applied by the axial center, thereby reducing the moment that develops between the point of action of the load and the mounting point, enabling secure engagement and support of the input load.

The contents of Japanese Patent Application No. 10-263412 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A power seat for vehicles comprising:
   a seat member;
   a pair of first and second rails slidable relative to each other and either carrying the seat member; and
   a powered drive mechanism including
      a gear box fixed to the first rail,
      a lead screw extending from the gear box,
      a nut member fixed to the second rail and screwed on the lead screw, and
      a rigid member fixed to the first rail at a different position from the gear box and engaging with the lead screw in an axially secured manner between the gear box and the nut member, whereby the lead screw is tensioned with a load imparted thereto via the rigid member.

2. The power seat of claim 1, wherein the rigid member engages with the lead screw in a symmetrical manner about an axis of the lead screw.

3. The power seat of claim 1, wherein the rigid member comprises a bracket secured to the first rail and fitted in a circumferential groove of the lead screw.

4. The power seat of claim 3, wherein the circumferential groove is formed in a bulged portion of the lead screw.

5. The power seat of claim 1, wherein the rigid member comprises a pair of brackets secured to the first rail and abutting on both sides of a circumferential projection of the lead screw.

6. The power seat of claim 5, wherein the circumferential projection is defined between a pair of circumferential grooves formed in a bulged portion of the lead screw.

7. The power seat of claim 1, wherein the rigid member comprises a bracket mounting astride on the lead screw.

8. The power seat of claim 1, wherein the rigid member comprises a bracket surrounding the lead screw.

9. A power seat for vehicles comprising:
   a seat member;
   a pair of first and second rails slidable relative to each other and either carrying the seat member; and
   a powered drive mechanism including
      a gear box fixed to the first rail,
      a lead screw extending from the gear box,
      a nut member fixed to the second rail and screwed on the lead screw, and
      load transmission means for axially imparting a load from the seat member to the lead screw between the gear box and the nut member, so that the lead screw is tensioned by the imparted load.

10. The power seat of claim 9, wherein the load transmission means comprises a rigid member secured to the rail and engaging with the lead screw to prevent axial displacement of the lead screw relative thereto, allowing rotation of the lead screw.

11. The power seat of claim 10, wherein the rigid member has a U-shaped cut mounting astride in a circumferential groove of the lead screw.

* * * * *